United States Patent [19]

Skoff et al.

[11] Patent Number: 5,390,884

[45] Date of Patent: Feb. 21, 1995

[54] LANTERN HOLDER

[76] Inventors: James A. Skoff; Peggy M. Skoff, both of 21765 362nd Ave., Bellevue, Iowa 52031-9054

[21] Appl. No.: 124,793

[22] Filed: Sep. 22, 1993

[51] Int. Cl.⁶ .............................................. A45F 3/44
[52] U.S. Cl. .................................... 248/156; 248/231; 248/545; 403/19; 403/299
[58] Field of Search ............... 248/156, 508, 545, 159, 248/176, 304, 346, 146, 231; 362/396; 403/19, 184, 299, 296, 293, 342

[56] References Cited

U.S. PATENT DOCUMENTS

| | | | |
|---|---|---|---|
| 3,285,554 | 11/1966 | Voelkerding | 248/156 X |
| 3,345,028 | 10/1967 | Lawrie | 248/231 |
| 3,746,294 | 7/1973 | Johnston | 248/231 X |
| 3,995,796 | 12/1976 | Kline | 248/156 X |
| 4,625,937 | 12/1986 | Haase | 248/159 X |
| 4,979,490 | 12/1990 | Nudo et al. | 248/545 X |
| 5,108,058 | 4/1992 | White | 248/156 X |
| 5,117,779 | 6/1992 | Karow | 248/231 X |

Primary Examiner—Ramon O. Ramirez
Attorney, Agent, or Firm—Hugh E. Smith

[57] ABSTRACT

An elongated support including a first rod having a first threaded end and a second threaded end, a second rod having a first distal end, a second threaded end and a washer member coupled to the second rod at the second end, the first distal end forming an S-shape for releasably supporting a lantern, a nut member having threads on an external surface thereof, a lug member threadibly engaging the second end of the second rod adjacent to the washer member, and a cup member rotatably positioned intermediate the lug member and said disk for threadily engaging the bolt member.

8 Claims, 4 Drawing Sheets

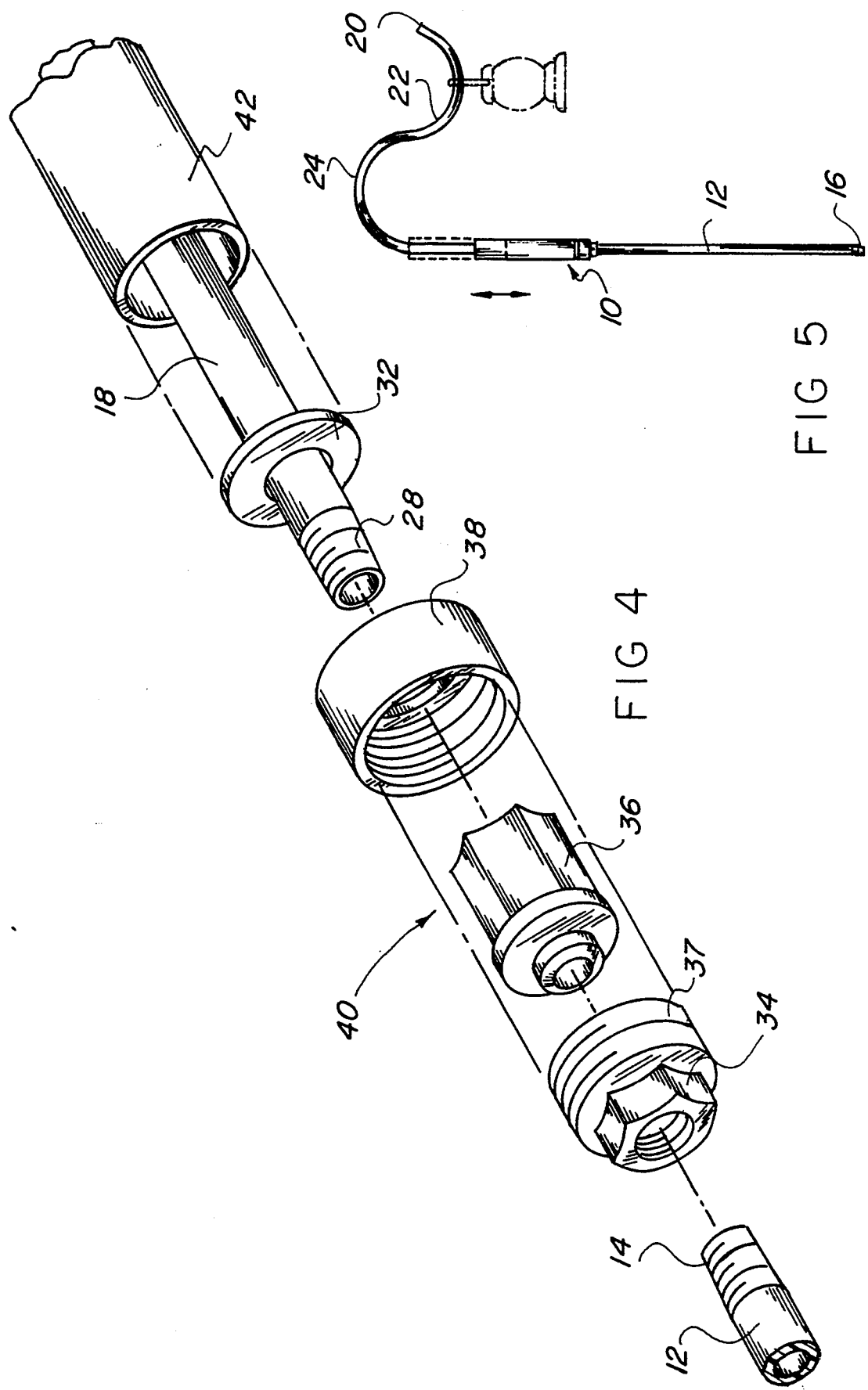

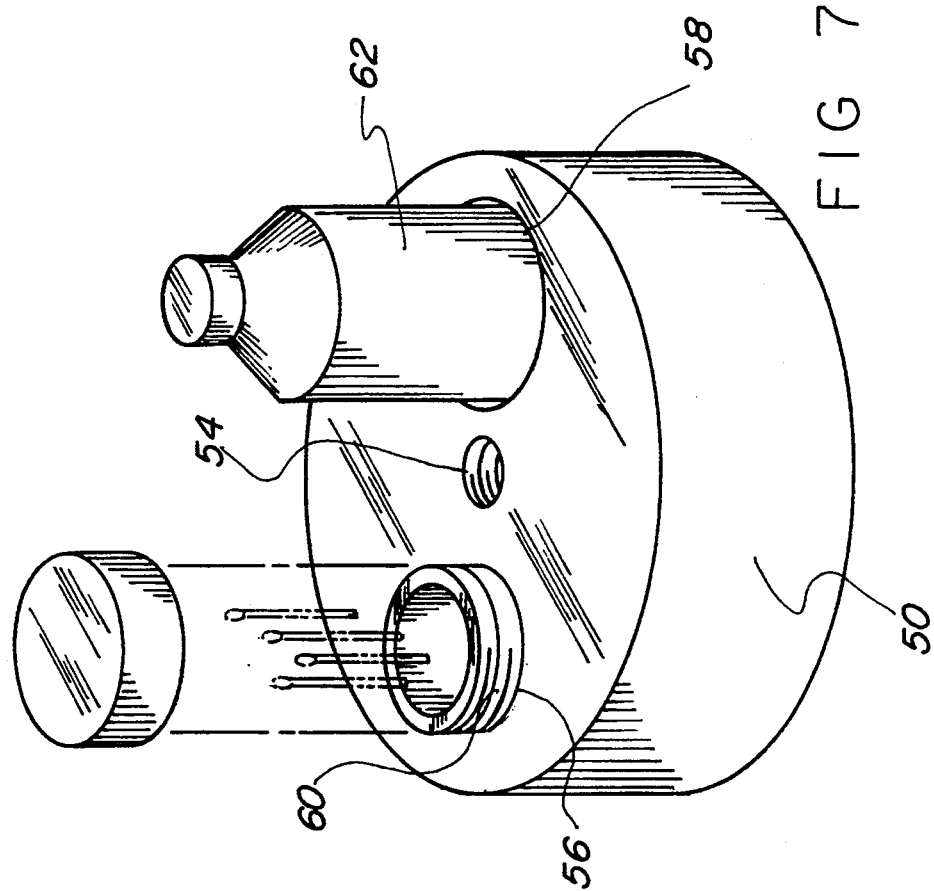
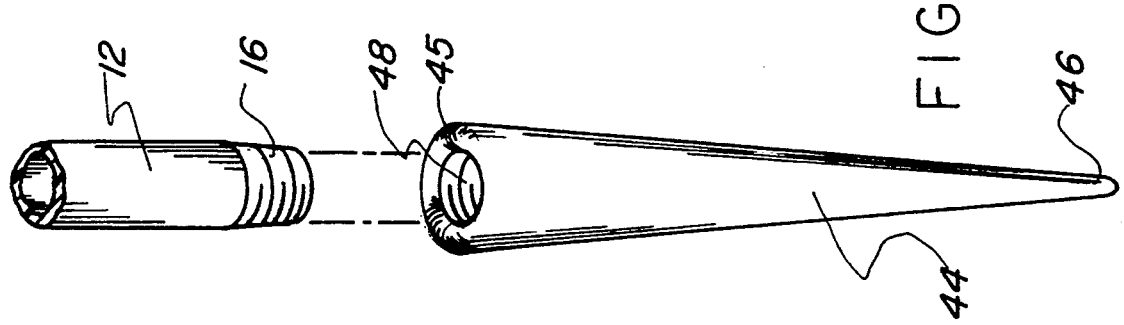

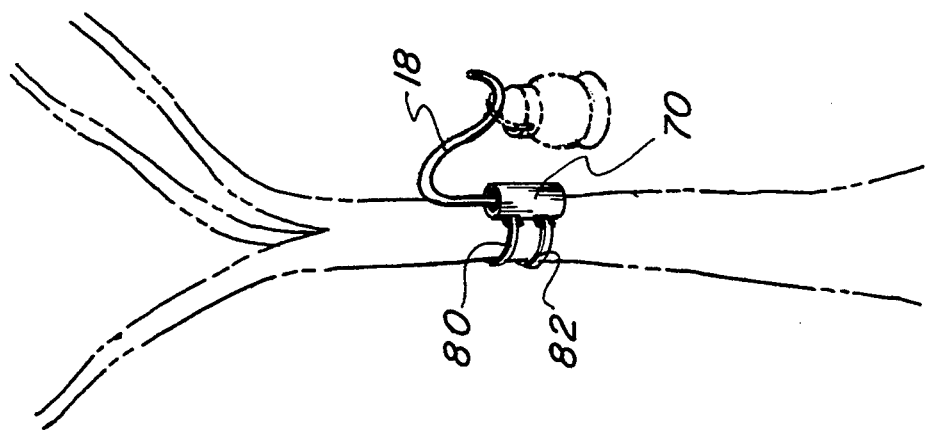
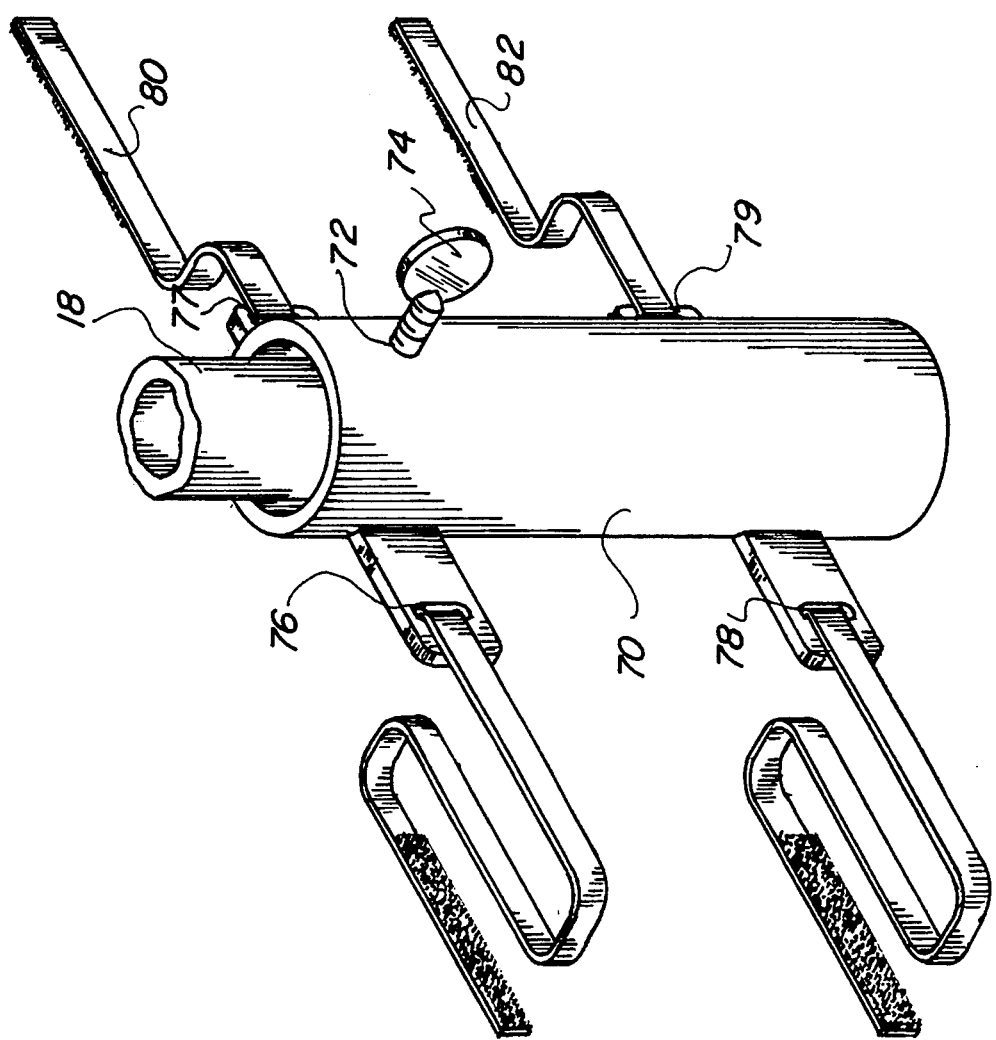

LANTERN HOLDER

BACKGROUND OF THE INVENTION

1. Field of the Invention

The present invention relates to an improved lantern holder and more particularly pertains to a outdoor lantern holder constructed for camping comprising a first rod and a second rod having an S-shaped end for releasably supporting a lantern.

2. Description of the Prior Art

The use of lantern holders is known in the prior art. More specifically, lantern holders devised and utilized for the purpose of outdoor illumination are known to consist basically of familiar, expected and obvious structural configurations, notwithstanding the myriad of designs encompassed by the crowded prior art which have been developed for the fulfillment of countless objectives and requirements.

The present invention is directed to improving devices for outdoor illumination in a manner which is safe, secure, economical, and aesthetically pleasing.

The prior art discloses several types of lantern holders. By way of example, U.S. Pat. No. 3,998,418 to Boulanger, Disclosure 285,124 to Hoover, and U.S. Pat. No. 4,709,890 to Moore encompass ideas related to lantern holders for mounting onto a boat. Patent '418 describes a device made of one metal rod-like post with one end attached to an oarlock. The post has a slot formed at the other end for accommodating the bail of a lantern in an upright position above the boat. Disclosure '124 discloses a device having a metal base that is permanently attached to a boat surface. There is an obtuse angle bend in a metal rod which is used to support a rod over the water where a hook is suspended to hold a lantern.

Patent '890 describes a lantern holder comprising an elongated support arm defining a first end portion and a distal end portion provided with means for releasably engaging a lantern. The lantern holder further comprises a shank portion for releasably engaging a boat cleat. This shank portion defines the first end portion and is provided with a retaining means for engaging the upper portion of the cleat where the shank portion is releasably held in position beneath the upper portion of the cleat.

Patent '603 has as a basis for a disclosure with two arms with a joint in the middle both arms contain hooks at their end one hook engages the cleat of the boat, the other hook releasably engages a lantern.

Further U.S. Pat. No. 4,395,013 to Wissinger discloses a lantern holder having a base portion with a pair of legs on one end, an elevatable plate on an opposite end. The plate retains an adjustable O-clamp for gripping a lantern. The holder further includes a vertical member for suitably securing the structure to various devices.

None of lantern holders can be suitably used for outdoor camping, as all of the disclosures depend upon the boat and related structure for supporting lanterns.

In this respect, the lantern holder according to the present invention substantially departs from the conventional concepts and designs of the prior art, and in so doing provides an apparatus developed for the purpose of holding a lantern, using the ground or an artificial substrate.

Therefore, it can be appreciated that there exists a continuing need for a new and improved lantern holder which can be used outdoors for camping. In this regard, the present invention substantially fulfills this need.

As illustrated by the background art, efforts are continuously being made in an attempt to devise a lantern holder of unique construction. No prior-art, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful, and unobvious combination of method steps and component elements,with the use of a minimum number of functioning parts, at a reasonable cost to manufacture, and by employing readily available materials.

SUMMARY OF THE INVENTION

In view of the foregoing disadvantages inherent in the known types of lantern holders now present in the prior art, the present invention provides an improved lantern holder construction wherein the same can be utilized for supporting a lantern. As such, the general purpose of the present invention, which will be described subsequently in greater detail, is to provide a new and improved lantern holder apparatus which has many of the advantages of the prior art lantern holders, and many more novel features that result in a lantern holder which is not anticipated, rendered obvious, suggested, or even implied by any of the prior art lantern holders, either alone or in a combination thereof.

The invention is defined by the appended claims with the specific embodiment shown in the attached drawings. For the purpose of summarizing the invention, the invention may be incorporated into a lantern holder for releasably supporting a lantern.

The lantern holder comprising an elongated support. The support including a first pipe or rod having a first threaded end and a second threaded end. The holder further includes a second pipe or rod having a first distal end and a second threaded end. A washer member is coupled to the second pipe at the second end thereof. The first distal end of the second pipe forms an S-shape for releasably supporting a lantern. A connection means for releasably securing the first and second pipe further comprises the holder. The connection means includes a disk positioned adjacent to the threaded end of the second pipe and a cap member positioned about the second pipe intermediate the threaded end and the disk. Additionally, a bolt member threadily engages the first threaded end of the first pipe. The bolt member has a threaded exterior surface for engaging the cap member to thereby couple the first pipe to the second pipe. A lug member is threadily engaged with the end of the second pipe and positioned within the cap member. Finally, a hammer means is included in the lantern holder. The hammer means has a hollow extent therethrough for positioning about the second rod reciprocal thereabout. The hammer means engages the disk for driving the lantern holder into the surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and will form the subject of the claims appended hereto. In as much as the foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited to its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate the conception upon which this disclosure is based, may readily be utilized as a basis for the designing of other structures, methods, and systems for carrying out the several purposes of the present invention. It is important therefore, that the claims be regarded as including such equivalent constructions insofar as they do not depart from the spirit to the present invention.

Further, the purpose of the foregoing abstract is to enable the U.S. Patent and Trademark Office and the public generally, and especially the scientists, engineers, and practitioners in the art who are not familiar with patent or legal terms or phraseology,to determine quickly from a cursory inspection the nature and essence of the technical disclosure of the application. The abstract is neither intended to define the invention of the application, which is measured by the claims, nor is it intended to be limited as to the scope of the invention in any way.

Therefore, it is an object of the present invention to provide a lantern holder comprising a first rod having a first threaded end and a second threaded end, a second rod having a first distal end, a second threaded end and a disk coupled to the second rod at the second end, the first distal end forming an S-shape for releasably supporting a lantern, and a connection means for releasably coupling said first rod and said second rod, the coupling means including a nut member having threads on the external surface thereof threadily engaging the first end of the first rod, a lug member threadily engaging the second end of the second rod adjacent to the disk, a cap member rotatably positioned intermediate the lug member and said disk for threadily engaging the nut member.

It is therefore an additional object of the present invention to provide a new and improved lantern holder including hammer means for driving the lantern holder into a substrate. It is another object of the present invention to provide a new and improved lantern holder which may be efficiently manufactured and marketed.

It is the further object of the present invention is to provide a new and improved lantern holder which is of a durable and reliable construction.

An even further object of the present invention is to provide a new and improved lantern holder which is of a low cost of manufacture with regard to both materials and labor, and which accordingly is then susceptible of low prices of sale to the consuming public, thereby making such lantern holders economically available to the buying public.

Still yet another object of the present invention is to provide a new and improved lantern holder which provides in the apparatus and methods of the prior art some of the advantages thereof, while simultaneously overcoming some of the disadvantages normally associated therewith.

Still another object of the present invention is to provide a new and approved stability for the lantern holder, independent of a oarlock, boat seat, or ladder for support.

Yet another object of the present invention is to provide a new and improved method of coupling the components of a lantern holder together for rapid assembly and disassembly, increasing the efficiency and mobility of the user for camping and hunting.

Even still another object of the present invention is to provide a new and improved lantern holder that can be attached to a tent pole, a tree, or a vehicle by hook and loop fasteners and stabilized by a set screw that binds the second rod to a slide hammer means surrounding it that is also used to pound the lantern holder into the ground, wherein there is no need to support the lantern holder by the use of the first rod it can be detached leaving just the hook and loop fasteners for supporting the lantern holder.

These together with the other objects of the invention, along with the various features of novelty which characterize the invention, are pointed out with particularity in the claims annexed to and forming a part of this disclosure. For a better understanding of the invention, its operating advantages and the specific objects obtained by its uses, references should be had to the accompanying drawings and descriptive matter in which there are illustrated preferred embodiments of the invention.

The foregoing has outlined some of the more pertinent objects of this invention. These objects should be construed as merely illustrative of some of the more prominent features and applications of the present invention. Many other beneficial results can be attained by applying the invention within the scope of the disclosure. Accordingly, other objects and a fuller understanding of the invention defined by the claims taken in conjunction with the accompanying drawings.

BRIEF DESCRIPTION OF THE DRAWINGS

This invention will be better understood and objects other those set forth above will become apparent when consideration is given to the following detailed description thereof. Such description makes reference to the annexed drawings wherein:

FIG. 4 is an exploded enlarged view showing a union consisting of a nut member, a lug member, and a cap member of the present invention.

FIG. 5 is a side elevational view of the lantern holder showing the assembly and operation of the present invention.

FIG. 6 is an enlarged view of a spike used to pierce the ground of the present invention.

FIG. 7 is an enlarged view of an artificial substrate with receptacles for receiving match and fluid containers of the present invention.

FIG. 8 is an enlarged view of the slide hammer having a set screw for tightening down to the second pipe and hook and loop fasteners of the present invention.

FIG. 9 s a reduced view of the lantern holder attached to a tree by the hook and loop fasteners with the first rod and union detached therefrom the present invention.

DESCRIPTION OF THE PREFERRED EMBODIMENT

Figure 1:
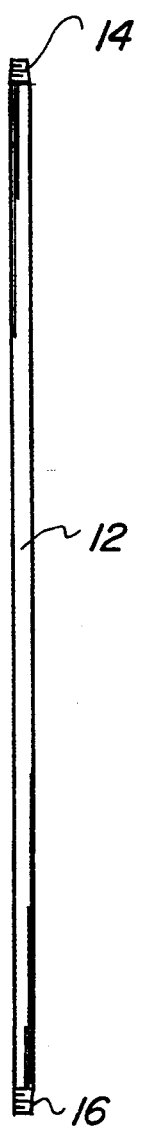
FIG. 1 is a side elevational view of a first rod of the present invention.
Figure 2:
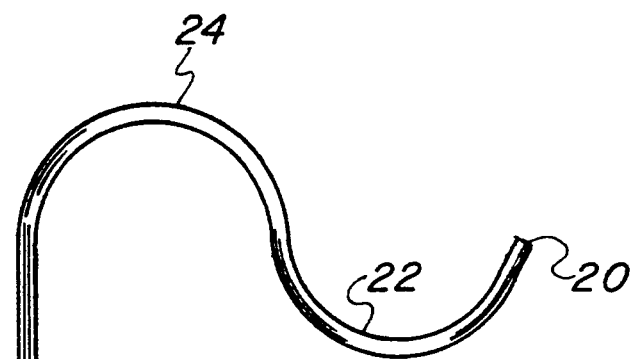
FIG. 2 is a side elevational view of a second rod of the present invention.
Figure 3:
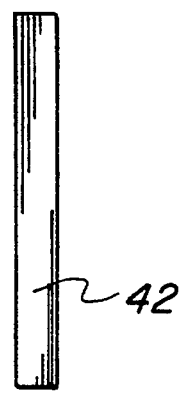
FIG. 3 is a side elevational view of a slide hammer used to drive the lantern holder into the ground of the present invention.

With reference now to the drawings, and in particular to FIGS. 1–9 thereof, a new and improved lantern holder embodying the principles and concepts of the present invention and generally designated by the reference numeral 10 will be described. From an overview stand point, the lantern holder is adapted for use with a lantern as seen in FIG. 5.

More specifically, it will be noted that the lantern holder 10 comprises a first rod or pipe 12 as shown in FIG. 1. The first pipe 12 has a first threaded end 14 and a second threaded end 16. Both ends comprise $\frac{1}{4}''$ diameter threads although the pipe diameter is $\frac{3}{8}''$.

The lantern holder further includes a second rod or pipe 18 having a first distal end 20. The first distal end releasably supports a lantern. The distal end 20 is S-shaped or sinusoidally shaped. Further, the second end includes an unthreaded end. The end 20 is be unthreaded or solid for supporting the lantern. A portion 22 of the second pipe 20 comprises a negative aspect of the S-shape for releasably securing the lantern. The positive aspect 24 of the S-shape provides structural integrity for the pipe. The strength of an S-shape distributes the weight of the lantern in an efficient manner. The linear portion 26 of the second pipe provides for sufficient height of the lantern holder 10 with respect to vertical orientation, so that the lantern will illuminate a predetermined area with acceptable luminosity. The second pipe includes a threaded end 28. Preferably, the threads of the second end are $\frac{1}{4}$ inches diameter.

The preferred embodiment of the present invention includes a connection means 40, for releasably coupling the first rod and the second rod. Preferably, the connection means comprises a pipe union. The pipe union 40 is a consists of a nut member 34, a lug member 36, and a cap member 38. See FIG. 4. The pipe union 40 releasably couples the first pipe 12 with the second pipe 20. The union includes a washer member 32. The washer member is positioned adjacent to the threaded end 28 of the second rod. The washer member 32 is coupled to the threaded end 28 for the pounding the lantern holder 10 into the ground.

Further, the cap member 38 is positioned about the threaded end 28 of the second rod adjacent the washer member 32. The nut member 34 threadily engages the threaded end of the second rod and is positioned within the cap member. The nut member 34 has internal threads for threadily coupling the nut member and the first end of the first rod. Additionally, the nut member includes external threads 37 engaging the threads of the cap member 38 for releasably coupling the first and second rods.

A hammer means 42 for driving the lantern holder into a substrate is further included in the lantern holder. The hammer means comprises a $\frac{3}{4}''$ steel pipe 42 having an interior cooperable with the second rod and washer member 32 such that the hammer means is reciprocal along the second rod and contacts the washer for driving the lantern holder 10 into the ground by reciprocal action of the hammer means. See FIGS. 3 and 5. The steel pipe 42 provides the force necessary to drive the lantern holder 10 into the ground by changing the gravitational potential energy when it is in the up position to mechanical energy when the steel pipe 42 goes through the motion of acceleration to strike the washer member 32 which halts the inertial progress of the pipe 42 being used as a hammer. The mechanical energy is essentially transferred by the washer 32 to the lantern holder 10.

As shown in FIG. 6, the lantern holder 10 has an accessory or spike 44. The spike includes a first pointed end 46 and a blunt second 45. The second end 45 includes a $\frac{1}{4}''$ diameter threaded aperture 48. The aperture 48 for receives the second end 16 of the first pipe 12 for piercing a substrate material such as the earth, sand, or mud (not shown). The spike 44 is constructed of a denser material than the substrate to transfer the mechanical energy created by the hammer means via displacing the substrate by the spike 44 having greater density and hardness.

In an alternate embodiment, the lantern holder comprises an artificial substrate means 50 for supporting the lantern holder. In the case where the substrate 50 is harder and denser than the spike 44 displacement does not occur, the artificial substrate means 50 is utilized to support the lantern holder 10. In the preferred embodiment, the artificial substrate means 50 is a raised circular base approximately 6 inches tall and an 8 inch radius. The base is made of metal or a hard engineering plastic. Further, the artificial substrate means contains a threaded recess 54 in the center of the base 50 to threadily engage the second end 16 of the first rod 12 for forming a support member for the lantern holder 12. The base 50 further includes a first and second receptacle 56 and 58 positioned alternately equidistant from the center of the recess 54. The receptacles receive a container 60 for matches and a container 62 for lantern fluid. See FIG. 7.

The matches 64 are kept dry by placement within the containers 60. The container 60 comprises a conventional cylindrical container having a threaded top coupled thereto. The match container is positioned within the first receptacle in the artificial substrate means. The lantern fuel 68 is kept inside a fuel container 62 to safely entrap any volatile gas the lantern fuel 68 gives off. The lantern fluid container 62 is placed within the second recess of the artificial substrate means.

In a further alternate embodiment, the hammer means comprises a portable mount for the lantern holder. The hammer means is incorporated into a supplemental mounting 70 for the lantern holder 10 by a threaded bore 72 extending through the hammer means and inserting a set screw 74 positioned therethrough. The set screw 74 passes through the hammer means and contacts the second rod to secure the hammer means as a single unitary entity for controlling the unwanted longitudinal and lateral motion of the second rod with respect to the hammer means. Further, the hammer means includes hook and loop fasteners 80 and 82 and slots or holes 76, 77, 78, and 79. The hook and loop fasteners 80 and 82 pass through 76 and 77, 78 and 79 respectively to engage the lantern holder 70 for support structure such as a tree, a tent pole (not shown) or some other elongated of sufficient strength to thereby support a lantern holder. See FIG. 8 and 9.

The union 40 and the first rod 12 can be detached in this embodiment for ease of storage or left on in case of inclement weather.

In a still further alternate embodiment, all the components of the lantern holder 10 can be fabricated out of a resin, such as polyvinyl chloride or polyvinylidene chloride. For a permanent configuration the lantern holder 10 can be permanently constructed by use of an adhesive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention. In as much as the present disclosure includes that contained in the appended claims as well as the foregoing description. Although this invention has been described in its preferred forms with a certain degree of particularity, it is understood that the present disclosure of the preferred form has been made by way of example and numerous changes in the details of construction and combination and arrangement of parts may be resorted to without departing from the spirit and scope of the invention.

What is claimed as being new and desired to be protected by Letters Patent of the United States is as follows:

1. A lantern holder for releasably supporting a lantern comprising:
   a first rod having a first threaded end and a second threaded end;
   a second rod having a first distal end, a second threaded end and a disk coupled to the second rod at the second end, the first distal end forming an S-shape fox releasably supporting a lantern;
   a connection means for releasably coupling said first rod and said second rod, the connection means including a nut member having threads on the external surface thereof threadably engaging the first end of the first rod, a lug member threadably engaging the second end of the second rod adjacent to the disk, a cap member rotatably positioned intermediate the lug member and said disk for threadably engaging the nut member; and,
   a hammer means having a hollow extent therethrough for positioning about the second rod reciprocal thereabout for engaging the disk for driving the lantern holder into a surface.

2. The lantern holder of claim 1 and further including a spike with a first pointed end and a blunt second end including a threaded aperture therethrough for receiving said second end of said first rod for piercing a substrate material.

3. The lantern holder of claim 1 and further including an artificial substrate means for supporting the lantern holder, the artificial substrate means having a threaded recess in a top surface thereof for receiving said second end of said first rod for supporting said lantern holder in a vertical orientation.

4. The lantern holder of claim 3 wherein the artificial substrate means includes at least one receptacle for receiving indicia.

5. The lantern holder of claim 4 wherein the artificial substrate means includes a plurality of receptacles having indicia positioned therein, the indicia comprising a container including matches therewithin and a container including lantern fuel therewithin.

6. The lantern holder of claim 1 wherein said first rod and said second rod are formed of a resin.

7. The lantern holder of claim 1 whereas said hammer means comprises a supplemental mounting means for supporting the lantern holder without said second end of said first rod engaging said substrate.

8. The lantern holder of claim 7 wherein said supplemental mounting means comprises a threaded aperture extending therethrough, a set screw positioned within said threaded aperture for engaging said second rod thereby coupling said supplemental mounting means and second rod, a plurality of slots extending through said supplemental mounting means and a plurality of hook and loop fasteners extending through said slots for securing said supplemental mounting means to a support structure.

* * * * *